US012766823B2

(12) United States Patent
Puthen Veettil et al.

(10) Patent No.: US 12,766,823 B2
(45) Date of Patent: Oct. 20, 2026

(54) DELAMINATING AND LAMINATING OF PHOTOVOLTAIC MODULES AND SOLAR CELLS USING MICROWAVES

(71) Applicant: Macquarie University, North Ryde (AU)

(72) Inventors: Binesh Puthen Veettil, North Ryde (AU); David Payne, North Ryde (AU); Mattias Juhl, North Ryde (AU); Darren Bagnall, North Ryde (AU)

(73) Assignee: Macquarie University, New South Wales (AU)

( * ) Notice: Subject to any disclaimer, the term of this patent is extended or adjusted under 35 U.S.C. 154(b) by 147 days.

(21) Appl. No.: 18/799,438

(22) PCT Filed: Feb. 9, 2023

(86) PCT No.: PCT/AU2023/050084
§ 371 (c)(1),
(2) Date: Aug. 9, 2024

(87) PCT Pub. No.: WO2023/150831
PCT Pub. Date: Aug. 17, 2023

(65) Prior Publication Data
US 2025/0115042 A1 Apr. 10, 2025

(30) Foreign Application Priority Data
Feb. 11, 2022 (AU) ................................ 2022900291
Feb. 11, 2022 (AU) ................................ 2022900292

(51) Int. Cl.
*B32B 43/00* (2006.01)
*H05B 6/80* (2006.01)

(52) U.S. Cl.
CPC ............ *B32B 43/006* (2013.01); *H05B 6/80* (2013.01); *B32B 2457/12* (2013.01)

(58) Field of Classification Search
CPC ... B29K 2023/083; Y02E 10/50; H10F 19/80; H05B 6/78; H05B 6/80; B29B 17/02;
(Continued)

(56) References Cited

U.S. PATENT DOCUMENTS 12,324,249 B2 * 6/2025 Allen ...................... H10F 19/85
2008/0236655 A1 10/2008 Baldwin et al.
(Continued)

FOREIGN PATENT DOCUMENTS

TW 1679068 B 12/2019
TW 1682555 B 1/2020

OTHER PUBLICATIONS

Translation of WO2023150831 (Year: 2023).*
(Continued)

*Primary Examiner* — Sonya M Sengupta
(74) *Attorney, Agent, or Firm* — Banner & Witcoff, Ltd.

(57) ABSTRACT

A method of delaminating a photovoltaic module is disclosed wherein the photovoltaic module comprises at least one solar cell having a first surface and a second surface opposite to the first surface, a first protective sheet, and a first encapsulant material positioned between the first surface of the at least one solar cell and the first protective sheet and fixing the first protective sheet to the at least one solar cell, the method comprising applying microwave radiation to the at least one solar cell to heat the at least one solar cell to a temperature above a melting or softening temperature of the first encapsulant material, wherein heat is transferred from the at least one solar cell to the first encapsulant material. A method of manufacturing a photovoltaic module is also disclosed that comprises applying microwave radiation to at least one solar cell.

15 Claims, 6 Drawing Sheets

(58) Field of Classification Search
CPC ...... B29B 2017/022; B29B 2017/0258; B32B 2457/12; B32B 43/006; B29L 2009/00; B29L 2031/34
See application file for complete search history.

(56) References Cited

U.S. PATENT DOCUMENTS

| | | | | |
|---|---|---|---|---|
| 2009/0032087 | A1 | 2/2009 | Kalejs | |
| 2010/0101646 | A1 | 4/2010 | Cadwallader et al. | |
| 2019/0371957 | A1* | 12/2019 | Sun | B32B 43/006 |
| 2025/0115042 | A1* | 4/2025 | Puthen Veettil | B32B 43/006 |

OTHER PUBLICATIONS

Translation of WO2023150831.*
Apr. 21, 2023 (WO) International Search Report and Written Opinion—App PCT/AU2023/050084.

* cited by examiner

DELAMINATING AND LAMINATING OF PHOTOVOLTAIC MODULES AND SOLAR CELLS USING MICROWAVES

CROSS-REFERENCE TO RELATED APPLICATIONS

The present application is a U.S. National Phase under 35 U.S.C. § 371 of International Application No. PCT/AU2023/050084, which was filed on Feb. 9, 2023 designating the United States of America and claiming priority to Australian Patent Application No. 2022900291, filed on Feb. 11, 2022, and to Australian provisional patent application no. 2022900292, also filed on Feb. 11, 2022. The entire contents of these applications are incorporated herein by reference in their entirety.

TECHNICAL FIELD

The present disclosure relates to a method of delaminating photovoltaic modules, and a method of laminating solar cells in the manufacture of photovoltaic modules, and associated apparatus.

BACKGROUND

Photovoltaic (PV) modules (also known as solar panels) are continuously exposed to potentially damaging environmental factors in use, such as moisture, oxygen and dirt. To ensure continued, effective performance of the solar cells within the PV modules, protective sheets, such as glass and/or polymeric sheets, are typically applied in a lamination process to both sides of the solar cells and each held in place by an encapsulant such as ethylene-vinyl acetate (EVA) layer or similar thermoplastic layer.

Lamination is traditionally achieved by melting the ethylene-vinyl acetate (EVA) layers or similar thermoplastic layers, when positioned between one or more solar cells and protective sheets on opposite sides of the solar cells, through the application of an external thermal heat source. For example, a stack of layers, which from top to bottom may include a front protective glass layer, an EVA layer, one or more solar cells, an EVA layer and a rear composite layer, may be inserted into conventional thermal heating apparatus and then heat may be applied to the stack of layers.

The lamination process can be slow and is often considered a bottleneck in a PV module production line. The heating process is also relatively energy inefficient.

After a photovoltaic module reaches the end of its useful lifetime, it can be desirable to delaminate the module, removing the protective sheets from the solar cells. This can allow for recovery and improved disposal or recycling of individual components of the PV modules.

To remove the protective sheets from the solar cell, traditionally one of three different approaches is undertaken. Mechanical delamination can use a knife or other tool to cut the protective sheets from the PV module, or else a mechanical crushing or shredding process can be used. Thermal delamination can heat the PV module in a furnace, melting or softening the encapsulant layers between the protective sheets and the solar cells and allowing the protective sheets to be separated from the solar cells. Chemical delamination can dissolve the encapsulant layers in solvents, again allowing the protective sheets to be separated from the solar cells.

Current delamination processes can be relative slow, complex and/or energy inefficient.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

According to one aspect, the present disclosure provides a method of delaminating a photovoltaic module, the photovoltaic module comprising at least one solar cell having a first surface and a second surface opposite to the first surface, a first protective sheet, and a first encapsulant material positioned between the first surface of the at least one solar cell and the first protective sheet and fixing the first protective sheet to the at least one solar cell, the method comprising:

- applying microwave radiation to the at least one solar cell to heat the at least one solar cell to a temperature above a melting or softening temperature of the first encapsulant material, wherein heat is transferred from the at least one solar cell to the first encapsulant material.

The heat transferred from the at least one solar cell to the first encapsulant material may cause the first encapsulant material to melt or soften.

The method may further comprise separating the first protective sheet from the at least one solar cell while the first encapsulant material is in a melted or softened state.

Additionally or alternatively, the heat transferred from the at least one solar cell to the first encapsulant material, and differences in thermal expansion coefficients between the components of the photovoltaic module, may cause a structural modification in the first encapsulant material (such as expansion resulting in the forming of bubbles or voids) that is sufficient to cause partial or full separation of the first protective sheet from the at least one solar cell.

The method may further comprise stopping or reducing the application of the microwave radiation to the at least one solar cell immediately before, during or after the first protective sheet is separated at least partly from the at least one solar cell.

In some embodiments, the photovoltaic module may comprise a second protective sheet, and a second encapsulant material positioned between the second surface of the at least one solar cell and the second protective sheet and fixing the second protective sheet to the at least one solar cell, and the method may comprise:

- applying microwave radiation to the at least one solar cell to heat the at least one solar cell to a temperature above a melting or softening temperature of the second encapsulant material, wherein heat is transferred from the at least one solar cell to the second encapsulant material.

The heat transferred from the at least one solar cell to the second encapsulant material may cause the second encapsulant material to melt or soften.

The method may further comprise separating the second protective sheet from the at least one solar cell while the second encapsulant material is in a melted or softened state.

Additionally or alternatively, the heat transferred from the at least one solar cell to the second encapsulant material, and differences in thermal expansion coefficients between the components of the photovoltaic module, may cause a structural modification in the second encapsulant material (such as expansion resulting in the forming of bubbles or voids)

that is sufficient to cause partial or full separation of the second protective sheet from the at least one solar cell.

The method may further comprise stopping or reducing the application of the microwave radiation to the at least one solar cell immediately before, during or after the second protective sheet is separated from the at least one solar cell.

The separation of the first protective sheet and the second protective sheet from the at least one solar cell may occur substantially simultaneously. For example, the melting, softening and/or structural modifying of the first encapsulant material and the second encapsulant material may be carried out through the application of the same burst or bursts of microwave radiation, and subsequent separation of the first and second protective sheets from the at least one solar cell may also occur substantially at the same time. Nevertheless, it is conceived that, in alternative embodiments, a sequential delamination process may be undertaken with: the first encapsulant material being melted, softened and/or structurally modified before or after the second encapsulant material; and/or the first protective sheet being separated from the at least one solar cell before or after the second protective sheet is separated from the at least one solar cell.

In some embodiments, an external separation force may be applied to the first and/or second protective sheets to assist in their separation from the solar cell, the external separation force being applied by one or more separation devices such as a robotic arm, a movable wedge, a lever, hot knife or otherwise. However, the method of the present disclosure may not require a specific mechanical separation device to be used; separation may occur due to application of an internal force resulting from the structural modification (e.g. expansion) of the encapsulant material, or under the effect of a force such as gravity, for example.

In some embodiments, the first protective sheet may comprise a glass layer. In some embodiments, the second protective sheet may comprise a glass layer. In some embodiments, the second protective sheet may comprise a polymeric layer such as a polyvinyl fluoride (PVF) layer, or a PVF and polyester (e.g. a Tedlar™ Polyester Tedlar™ (TPT)) layer, or a polyethylene terephthalate (PVT) layer. The first protective sheet may be located at a front (light-receiving) side of the PV module and the second protective sheet may be located at a rear side of the PV module, for example. In some embodiments, the first and/or second encapsulant material may be ethylene-vinyl acetate (EVA), although other thermoplastic materials may be used.

Generally, the method of the present disclosure may utilise a microwave radiation heating technique, to melt, soften or modify materials in a delamination process where a protective sheet is to be separated from one or more solar cells. The method may be utilised in place of a conventional thermal heating, mechanical or chemical technique or in combination with one or more of these conventional techniques. For example, in some embodiments, a conventional thermal heat source may be used to partially heat the at least one solar cell, with the solar cell reaching the desired temperature through the application of the microwave radiation. The conventional thermal heat source may employ an electrical heating element or gas-burner for example, and may heat the at least one solar cell through conduction, convection and/or infra-red radiation.

The method of the present disclosure may not require use of chemicals such as solvents at least in order to separate the first and/or second protective sheet from the one or more solar cells (e.g. no solvent may be used to dissolve or otherwise modify the encapsulant material prior to separation of the first and/or second protective sheet from the at least one solar cell). In this regard, solvent-free methods of delamination of a photovoltaic module may be provided in accordance with some embodiments of the present disclosure.

The microwave radiation may have a frequency of between 300 MHz and 300 GHz, e.g. between 1 GHz and 300 GHz, 1 GHz and 100 GHz, 2 GHz and 50 GHz or otherwise. For example, in one embodiment, the microwave radiation may have a frequency of between about 2 GHz and 3 GHz, e.g., about 2.5 GHz, although other microwave frequencies may be used. The microwave radiation may have a power of between 300 and 1000 W, for example, although other microwave powers may be used. The microwave radiation may heat the at least one solar cell to a temperature of at least 90° C., at least 120° C., at least 150° C., at least 200° C., at least 250° C. or otherwise.

In general, absorption of microwave radiation in materials is caused by energy losses in the material-radiation interaction. Energy loss includes the charge carrier conduction loss (in the case of high conductivity materials such as metals) or dipole polarisation loss (in the case of some dielectric materials). Semiconductors, such as silicon, lie between these two types of materials, and intrinsic crystalline silicon, in its purest form at ambient temperatures, is a poor absorber of microwaves. Nevertheless, the present inventors have determined that the semiconductor (e.g. silicon) material of a solar cell will absorb microwaves through charge conduction, likely due to the presence of free mobile carriers that are generated by doping or thermal or optical excitation, and the resultant heating of the solar cell can be used in a highly effective and efficient solar cell delamination process.

For example, microwave heating may provide for a more direct, volumetric and selective heating technique than conventional heating, particularly since the glass and/or polymeric layers are largely transparent to microwaves. In this regard, heating of an entire stack of layers need not occur, including heating of the relatively heavy and highly insulating protective sheets such as glass. Instead, the one or more solar cells can be targeted, providing for greater energy efficiency to melt, soften or structurally modify the encapsulant material, which may only constitute <1% by weight of the entire PV module.

The heating of the at least one solar cell to a melting or softening temperature of the first and/or second encapsulant material may comprise heating the at least one solar cell to a temperature that is at, or above, a melting point of the first and/or second encapsulant material. The heating may therefore be sufficiently high to cause melting of the first and/or second encapsulant material upon transfer of heat from the at least one solar cell to the first and/or second encapsulant material. Alternatively, heating of the at least one solar cell to a melting or softening temperature of the first and/or second encapsulant material may comprise heating the at least one solar cell to a temperature that is below the melting point of the first and/or second encapsulant (or is at or above the melting point but not sufficiently high to cause melting of the first and/or second material). The heating is nevertheless sufficiently high to cause the first and/or second encapsulant material to soften to an extent that the first and/or second protective sheet can be readily separated from the at least one solar cell in a delamination process (e.g., without needing to break or chemically treat the first and/or second protective sheet), and/or to be structurally modified to cause partial or full separation of the first and/or second protective sheet from the at least one solar cell. As indicated above, the microwave radiation may heat the at least one solar cell to a temperature of at least 90° C., at least 120° C., at least 150° C., at least 200° C., at least 250° C. or otherwise.

In some embodiments, the first and/or second encapsulant may completely melt or soften, or only partially melt or soften (e.g. only at a region closest to the at least one solar cell, but which nevertheless permits separation from the at least one solar cell in a delamination process).

The present disclosure may also provide apparatuses for carrying out the methods as described above or otherwise.

For example, in one aspect of the present disclosure there is provided photovoltaic module delamination apparatus comprising:

- a holder for receiving a photovoltaic module, the photovoltaic module comprising at least one solar cell having a first surface and a second surface, a first protective sheet, and a first encapsulant material positioned between the first surface of the at least one solar cell and the first protective sheet and fixing the first protective sheet to the at least one solar cell;
- a microwave device; and
- a controller configured to control the microwave device to apply microwave radiation to the at least one solar cell to heat the at least one solar cell to a temperature above a melting or softening temperature of the first encapsulant material, wherein heat is transferred from the at least one solar cell to the first encapsulant material.

The heat transferred from the at least one solar cell to the first encapsulant material may cause the first encapsulant material to melt or soften.

Additionally or alternatively, the heat transferred from the at least one solar cell to the first encapsulant material, and differences in thermal expansion coefficients between the components of the photovoltaic module, may cause a structural modification in the first encapsulant material (such as expansion resulting in the forming of bubbles or voids) that is sufficient to cause partial or full separation of the first protective sheet from the at least one solar cell.

The apparatus may comprise a separation device configured to separate the first protective sheet from the at least one solar cell while the first encapsulant material is in a melted or softened state and/or when the structural modification in the first encapsulant material has occurred.

The controller may be configured to stop or reduce the application of the microwave radiation to the at least one solar cell immediately before, during or after the first protective sheet is separated from the at least one solar cell.

In addition to the first protective sheet and the first encapsulant material, the holder may be configured to receive a photovoltaic module having a second protective sheet, and a second encapsulant material positioned between the second surface of the at least one solar cell and the second protective sheet. The controller may be configured to control the microwave device to apply microwave radiation to the at least one solar cell to heat the at least one solar cell to a temperature above a melting or softening temperature of the second encapsulant material, wherein heat is transferred from the at least one solar cell to the second encapsulant material.

The heat transferred from the at least one solar cell to the second encapsulant material may cause the second encapsulant material to melt or soften.

Additionally or alternatively, the heat transferred from the at least one solar cell to the second encapsulant material, and differences in thermal expansion coefficients between the components of the photovoltaic module, may cause a structural modification in the second encapsulant material (such as expansion resulting in the forming of bubbles or voids) that is sufficient to cause partial or full separation of the second protective sheet from the at least one solar cell.

The apparatus may comprise a separation device configured to separate the second protective sheet from the at least one solar cell while the second encapsulant material is in a melted or softened state and/or when the structural modification in the second encapsulant material have occurred.

The controller may be configured to stop or reduce the application of the microwave radiation to the at least one solar cell immediately before, during or after the second protective sheet is separated from the at least one solar cell.

The separation device to separate the first and second protective sheets from the at least one solar cell may be the same separation device, or first and second, respective, separation devices may be included. Each separation device may be a mechanical device such as a robotic arm, a movable wedge, a lever, hot knife or otherwise. However, apparatus of the present disclosure may not require a specific mechanical separation device to be included; separation may occur due to application of an internal force resulting from the structural modification (e.g. expansion) of the encapsulant material, and/or under the effect of a force such as gravity, for example.

In accordance with discussions above, the controller may be configured to control the microwave device so that the melting, softening and/or structural modifying of the first and/or second encapsulant materials, and/or separation of the first protective sheet and the second protective sheet from to the at least one solar cell, occurs substantially simultaneously, or else sequentially.

The holder may comprise an enclosed cavity in which the materials are located and the microwave device may be a magnetron or other solid-state microwave generator. Alternatively, the holder may have an open configuration, such as being in the form of a conveyor belt, and/or the microwave device may be a microwave gun or microwave antenna. This may provide for inline processing that increases PV module delaminating speeds over an enclosed cavity arrangement. Moreover, a back reflector may be used to reflect microwaves, e.g. to create a one-dimensional standing wave, and increase delamination efficiency.

In alternative aspects of the present disclosure, it is recognised that the methods and apparatus may be utilised to delaminate a photovoltaic module that may not employ an encapsulant material between the at least one solar cell and the first and/or second protective sheet. In these alternative aspects, the first and/or second protective sheet may be formed of a material that can melt, soften or structurally modify upon heat being transferred from the at least one solar cell to the first and/or second protective sheet. For example, the first and/or second protective sheet may comprise a low-melting point glass, plastic or acrylic or other material.

In this regard, according to one aspect, the present disclosure provides a method of delaminating a photovoltaic module, the photovoltaic module comprising at least one solar cell having a first surface and a second surface opposite to the first surface, a first protective sheet fixed to the first surface of the at least one solar cell, the method comprising:

- applying microwave radiation to the at least one solar cell to heat the at least one solar cell to a temperature above a melting or softening temperature of the first protective sheet, wherein heat is transferred from the at least one solar cell to the first protective sheet.

The heat transferred from the at least one solar cell to the first protective sheet may cause the first protective sheet to enter a melted, softened and/or structurally modified state. The first protective sheet may be separated from the at least one solar cell while the first protective sheet is in the melted, softened and/or structurally modified state.

This method and an associated apparatus may be configured to include any additional features substantially as described above, but with the first (and optionally a second) protective sheet being configured to melt, soften or structurally modify and be separated directly from the at least one solar cell, without necessarily requiring melting, softening or structural modifying of any separate first encapsulant or second encapsulant material. Again, the delamination approach may be solvent-free in some embodiments.

The heating of the at least one solar cell to a melting or softening temperature of the first and/or second protective sheet may comprise heating the at least one solar cell to a temperature that is at, or above, a melting point of the first and/or second protective sheet. The heating may therefore be sufficiently high to cause melting of the first and/or second protective sheet upon transfer of heat from the at least one solar cell to the first and/or second sheet. Alternatively, heating of the at least one solar cell to a melting or softening temperature of the first and/or second protective sheet may comprise heating the at least one solar cell to a temperature that is below the melting point of the first and/or second protective sheet (or is at or above the melting point but not sufficiently high to cause melting of the first and/or second protective sheet). The heating is nevertheless sufficiently high to cause the first and/or second protective sheet to soften to an extent that the first and/or second protective sheet can be readily separated from the at least one solar cell in a delamination process (e.g., without needing to break or chemically treat the first and/or second protective sheet), and/or to be structurally modified to cause partial or full separation of the first and/or second protective sheet from the at least one solar cell. As indicated above, the microwave radiation may heat the at least one solar cell to a temperature of at least 90° C., at least 120° C., at least 150° C., at least 200° C., at least 250° C. or otherwise.

In some embodiments, the first and/or second protective sheet may completely melt or soften, or only partially melt or soften (e.g. only at a region closest to the at least one solar cell, but which nevertheless permits separation from the at least one solar cell in a delamination process).

According to one aspect, the present disclosure provides a method of manufacturing a photovoltaic module comprising:

- providing:
  - at least one solar cell having a first surface and a second surface opposite to the first surface,
  - a first protective sheet, and
  - a first encapsulant material positioned between the first surface of the at least one solar cell and the first protective sheet; and
- applying microwave radiation to the at least one solar cell to heat the at least one solar cell to a temperature above a melting or softening temperature of the first encapsulant material, wherein heat is transferred from the at least one solar cell to the first encapsulant material, causing the first encapsulant material to melt or soften.

The method may further comprise stopping or reducing the application of the microwave radiation to the at least one solar cell, wherein the first encapsulant material sets or hardens and fixes the first protective sheet to the at least one solar cell.

The method may further comprise:

- providing:
  - a second protective sheet, and
  - a second encapsulant material positioned between the second surface of the at least one solar cell and the second protective sheet; and
- applying microwave radiation to the at least one solar cell to heat the at least one solar cell to a temperature above a melting or softening temperature of the second encapsulant material, wherein heat is transferred from the at least one solar cell to the second encapsulant material, causing the second encapsulant material to melt or soften.

The method may further comprise stopping or reducing the application of the microwave radiation to the at least one solar cell, wherein the second encapsulant material sets or hardens and fixes the second protective sheet to the at least one solar cell.

The fixing of the first protective sheet and the second protective sheet to the at least one solar cell may occur substantially simultaneously. For example, the melting or softening of the first encapsulant material and the melting or softening of the second encapsulant material may be carried out through the application of the same burst or bursts of microwave radiation, and subsequent cooling and setting of the first and second encapsulant materials may also occur substantially at the same time. The first and second encapsulant materials may therefore both be positioned between the respective first and second surfaces of the at least one solar cell prior to the application of the microwave radiation. Nevertheless, it is conceived that, in alternative embodiments, a sequential lamination process may be undertaken with the first protective sheet being fixed to the at least one solar cell before or after the second protective sheet is fixed to the at least one solar cell.

In some embodiments, a compression force may be applied to the first and/or second protective sheets to assist in their fixing to the solar cell. However, the method of the present disclosure may not require a compression force to be applied.

In some embodiments, the first protective sheet may comprise a glass layer. In some embodiments, the second protective sheet may comprise a glass layer. In some embodiments, the second protective sheet may comprise a polymeric layer such as a polyvinyl fluoride (PVF) layer, or a PVF and polyester (e.g. a Tedlar™ Polyester Tedlar™ (TPT)) layer, or a polyethylene terephthalate (PVT) layer. The first protective sheet may be located at a front (light-receiving) side of the PV module and the second protective sheet may be located at a rear side of the PV module, for example. In some embodiments, the first and/or second encapsulant material may be ethylene-vinyl acetate (EVA) although other thermoplastic materials may be used.

Generally, the method of the present disclosure may utilise a microwave radiation heating technique to melt or soften materials in a lamination process where a protective sheet is fixed to one or more solar cells. The method may be utilised in place of a conventional thermal heating technique or in combination with a conventional thermal heating technique. For example, in some embodiments, a conventional thermal heat source may be used to partially heat the at least one solar cell, with the solar cell reaching the desired temperature through the application of the microwave radiation. The conventional thermal heat source may employ an electrical heating element or gas-burner for example, and may heat the at least one solar cell through conduction, convection and/or infra-red radiation.

The microwave radiation may have a frequency of between 300 MHz and 300 GHz, e.g. between 1 GHz and 300 GHz, 1 GHz and 100 GHz, 2 GHz and 50 GHz or otherwise. For example, in one embodiment, the microwave radiation may have a frequency of between about 2 GHz and 3 GHZ, e.g., about 2.5 GHz, although other microwave frequencies may be used. The microwave radiation may have a power of between 300 and 1000 W, for example. The microwave radiation may heat the at least one solar cell to a temperature of at least 90° C., at least 120° C., at least 150° C., at least 200° C., at least 250° C. or otherwise.

In general, absorption of microwave radiation in materials is caused by energy losses in the material-radiation interaction. Energy loss includes the charge carrier conduction loss (in the case of high conductivity materials such as metals) or dipole polarisation loss (in the case of some dielectric materials). Semiconductors, such as silicon, lie between these two types of materials, and intrinsic crystalline silicon, in its purest form at ambient temperatures, is a poor absorber of microwaves. Nevertheless, the present inventors have determined that the semiconductor (e.g. silicon) material of a solar cell will absorb microwaves through charge conduction, likely due to the presence of free mobile carriers that are generated by doping or thermal or optical excitation, and the resultant heating of the solar cell can be used in a highly effective and efficient solar cell lamination process.

For example, microwave heating may provide for a more direct, volumetric and selective heating technique than conventional heating, particularly since the glass and/or polymeric layers are largely transparent to microwaves. In this regard, heating of an entire stack of layers need not occur, including heating of the relatively heavy and highly insulating protective sheets such as glass. Instead, the one or more solar cells can be targeted, providing for greater energy efficiency to melt or soften the encapsulant material, which may only constitute <1% by weight of the entire PV module.

The heating of the at least one solar cell to a melting or softening temperature of the first and/or second encapsulant material may comprise heating the at least one solar cell to a temperature that is at, or above, a melting point of the first and/or second encapsulant material. The heating may therefore be sufficiently high to cause melting of the first and/or second encapsulant material upon transfer of heat from the at least one solar cell to the first and/or second encapsulant material. Alternatively, heating of the at least one solar cell to a melting or softening temperature of the first and/or second encapsulant material may comprise heating the at least one solar cell to a temperature that is below the melting point of the first and/or second encapsulant (or is at or above the melting point but not sufficiently high to cause melting of the first and/or second material). The heating is nevertheless sufficiently high to cause the first and/or second encapsulant material to soften to an extent that the first and/or second protective sheet can be readily fixed (adhered) to the at least one solar cell in a lamination process, including through the first and/or second encapsulant material subsequently setting or hardening. As indicated above, the microwave radiation may heat the at least one solar cell to a temperature of at least 90° C., at least 120° C., at least 150° C., at least 200° C., at least 250° C. or otherwise.

In some embodiments, the first and/or second encapsulant may completely melt or soften, or only partially melt or soften (e.g. only at a region closest to the at least one solar cell, but which nevertheless permits adhesion to the at least one solar cell in a lamination process).

The present disclosure may also provide apparatuses for carrying out the methods as described above or otherwise.

For example, in one aspect of the present disclosure there is provided photovoltaic module lamination apparatus comprising:

a holder for receiving: at least one solar cell, the solar cell having a first surface and a second surface opposite to the first surface; a first protective sheet; and a first encapsulant material positioned between the first surface of the at least one solar cell and the first protective sheet;

a microwave device; and a controller configured to control the microwave device to apply microwave radiation to the at least one solar cell to heat the at least one solar cell to a temperature above a melting or softening temperature of the first encapsulant material, wherein heat is transferred from the at least one solar cell to the first encapsulant material, causing the first encapsulant material to melt or soften.

The controller may be configured to stop or reduce the application of the microwave radiation to the at least one solar cell, wherein the first encapsulant material sets or hardens and fixes the first protective sheet to the at least one solar cell.

In addition to the first protective sheet and the first encapsulant material, the holder may be configured to receive a second protective sheet, and a second encapsulant material positioned between the second surface of the at least one solar cell and the second protective sheet. The controller may be configured to control the microwave device to apply microwave radiation to the at least one solar cell to heat the at least one solar cell to a temperature above a melting or softening temperature of the second encapsulant material, wherein heat is transferred from the at least one solar cell to the second encapsulant material, causing the second encapsulant material to melt or soften.

The controller may be configured to stop or reduce the application of the microwave radiation to the at least one solar cell, wherein the second encapsulant material sets or hardens and fixes the second protective sheet to the at least one solar cell.

In accordance with discussions above, the controller may be configured to control the microwave device so that the fixing of the first protective sheet and the second protective sheet to the at least one solar cell occurs substantially simultaneously, or else sequentially.

The holder may comprise an enclosed cavity in which the materials are located and the microwave device may be a magnetron or other solid-state microwave generator. Alternatively, the holder may have an open configuration, such as being in the form of a conveyor belt, and/or the microwave device may be a microwave gun or microwave antenna. This may provide for inline processing that increases PV module manufacturing speeds over an enclosed cavity arrangement. Moreover, a back reflector may be used to reflect microwaves, e.g. to create a one-dimensional standing wave, and increase lamination efficiency.

In some embodiments, the apparatus may comprise a compression device to apply a force to the first and/or second protective sheets to assist in their fixing to the solar cell. However, the method of the present disclosure may be such that a compression device is not needed.

In alternative aspects of the present disclosure, it is recognised that the methods and apparatus may be utilised to manufacture a PV module without employing encapsulant material between the at least one solar cell and the first and/or second protective sheet. In these alternative aspects, the first and/or second protective sheet may be formed of a material that can melt or soften upon heat being transferred from the at least one solar cell to the first and/or second protective sheet. For example, the first and/or second protective sheet may comprise a low-melting point glass, plastic or acrylic or other material.

In this regard, according to one aspect, the present disclosure provides a method of manufacturing a photovoltaic module comprising:

providing:

at least one solar cell having a first surface and a second surface opposite to the first surface, and a first protective sheet; and applying microwave radiation to the at least one solar cell to heat the at least one solar cell to a temperature above a melting or softening temperature of the first protective sheet, wherein heat is transferred from the at least one solar cell to the first protective sheet causing the first protective sheet to melt or soften.

This method and an associated apparatus may be configured to include any additional features substantially as described above, but with the first (and optionally a second) protective sheet being configured to melt or soften and fix directly to the at least one solar cell, without necessarily requiring use of a separate first encapsulant or second encapsulant material.

The heating of the at least one solar cell to a melting or softening temperature of the first and/or second protective sheet may comprise heating the at least one solar cell to a temperature that is at, or above, a melting point of the first and/or second protective sheet. The heating may therefore be sufficiently high to cause melting of the first and/or second protective sheet upon transfer of heat from the at least one solar cell to the first and/or second sheet. Alternatively, heating of the at least one solar cell to a melting or softening temperature of the first and/or second protective sheet may comprise heating the at least one solar cell to a temperature that is below the melting point of the first and/or second protective sheet (or is at or above the melting point but not sufficiently high to cause melting of the first and/or second protective sheet). The heating is nevertheless sufficiently high to cause the first and/or second protective sheet to soften to an extent that the first and/or second protective sheet can be readily fixed (adhered) to the at least one solar cell in a lamination process, including through the first and/or second protective sheet subsequently setting or hardening. As indicated above, the microwave radiation may heat the at least one solar cell to a temperature of at least 90° C., at least 120° C., at least 150° C., at least 200° C., at least 250° C. or otherwise.

In some embodiments, the first and/or second protective sheet may completely melt or soften, or only partially melt or soften (e.g. only at a region closest to the at least one solar cell, but which nevertheless permits adhesion to the at least one solar cell in a lamination process).

Throughout this specification the word “comprise”, or variations such as “comprises” or “comprising”, will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure are now described by way of example with reference to the accompanying Figures in which.

DESCRIPTION OF EMBODIMENTS

Figure 1:
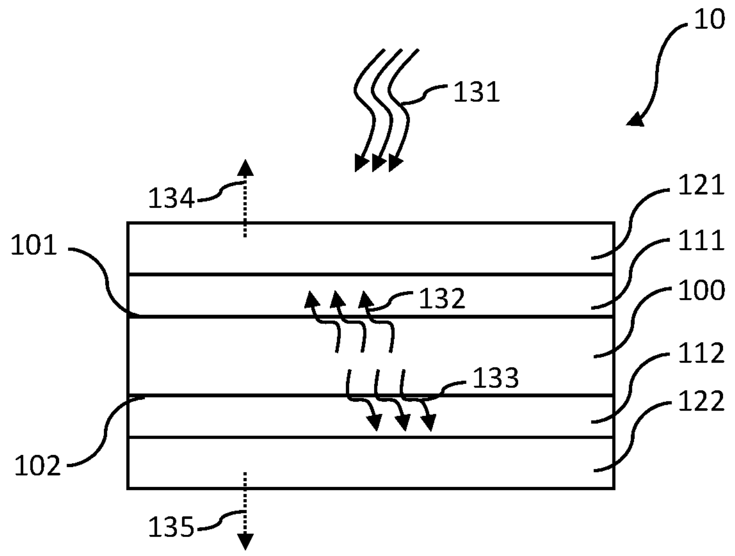
FIG. 1 shows a schematic drawing of a PV module in a delamination method according to an embodiment of the present disclosure.

FIG. 1 illustrates a PV module 10 including at least one solar cell 100 having first and second opposite surfaces 101, 102, a first protective sheet 121 and a first encapsulant material 111 positioned between the first surface 101 of the at least one solar cell 100 and the first protective sheet 121 and fixing the first protective sheet 121 to the at least one solar cell 100.

Figure 2A:
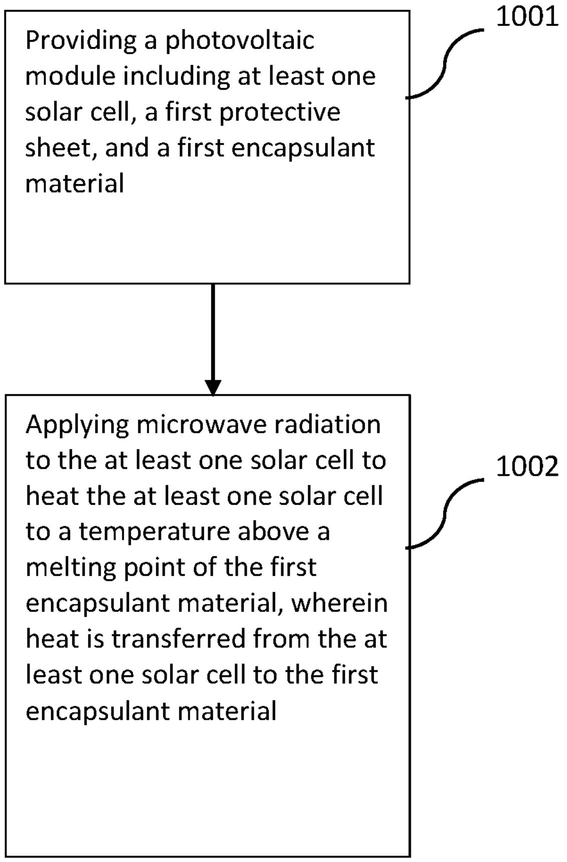
FIGS. 2*a* and 2*b* show flowcharts of methods of delaminating a PV module according to embodiments of the present disclosure.

With reference also to FIG. 2*a*, in a method of delaminating a PV module according to the present disclosure, after providing 1001 the photovoltaic module 10 including the at least one solar cell 100, the first protective sheet 121 and the first encapsulant material 111, the method further comprises applying 1002 microwave radiation (represented by arrows 131 in FIG. 1) to the at least one solar cell 100 to heat the at least one solar cell 100 to a temperature above a melting or softening temperature of the first encapsulant material 111, wherein heat (represented by arrows 132 in FIG. 1) is transferred from the at least one solar cell 100 to the first encapsulant material 111. The heat transferred from the at least one solar cell 100 to the first encapsulant material 111 can cause the first encapsulant material 111 to melt, soften and/or cause a structural modification in the first encapsulant material 111 (such as expansion resulting in the forming of bubbles or voids).

In some embodiments, and as illustrated in FIG. 1, the layers of the PV module may also include a second protective sheet 122 and a second encapsulant material 112 positioned between the second surface 102 of the at least one solar cell 100 and the second protective sheet 122 and fixing the second protective sheet 122 to the at least one solar cell 100.

Figure 2B:
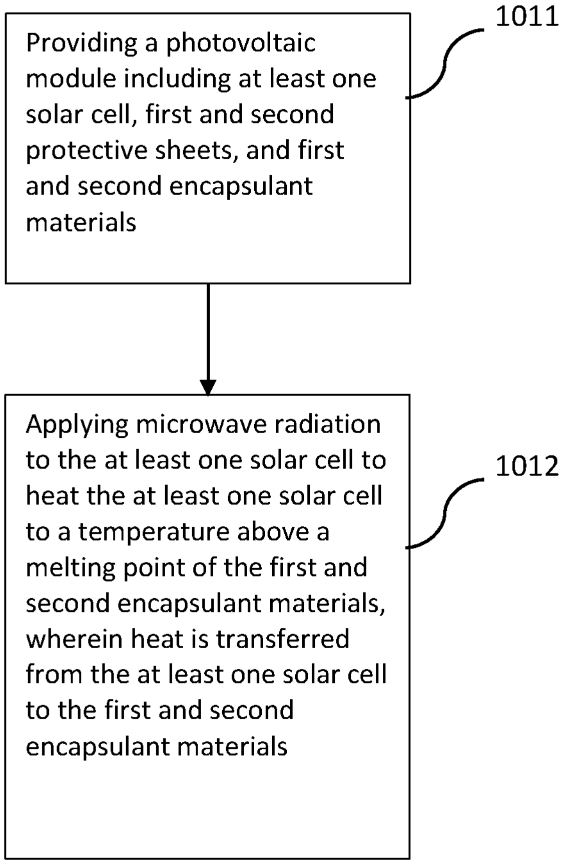

With reference to FIG. 2*b*, in a method of delaminating a PV module 10 according to the present disclosure, after providing 1011 the photovoltaic module including the at least one solar cell 100, the first and second protective sheets 121, 122 and the first and second encapsulant materials 111, 112, the method further comprises applying 1012 microwave radiation (represented by arrows 131 in FIG. 1) to the at least one solar cell 100 to heat the at least one solar cell 100 to a temperature above a melting or softening temperature of the first and second encapsulant materials 111, 112 wherein heat (represented by arrows 132, 133 in FIG. 1) is transferred from the at least one solar cell 100 to the first and second encapsulant materials 111, 112. The heat transferred from the at least one solar cell 100 to the first and second encapsulant materials 111, 112 can cause the first and second encapsulant materials 111, 112 to melt, soften and/or cause a structural modification in the first and second encapsulant materials 111, 112 (such as expansion resulting in the forming of bubbles or voids).

In embodiments of the present disclosure, the methods may further include separating the first protective sheet 121 from the at least one solar cell 100 while the first encapsulant material 111 is in a melted, softened and/or structurally modified state and/or separating the second protective sheet 122 from the at least one solar cell 100 while the second encapsulant material 112 is in a melted, softened and/or structurally modified state.

In embodiments of the present disclosure, the methods may further include stopping or reducing the application of the microwave radiation 131 to the at least one solar cell 100, immediately before, during or after the first protective sheet 121 and/or the second protective sheet 122 is separated from the at least one solar cell.

The separation of the first protective sheet 121 and the second protective sheet 122 from the at least one solar cell may occur substantially simultaneously. For example, the melting, softening and/or structural modification of the first encapsulant material 111 and the melting, softening and/or structural modification of the second encapsulant material 112 may be carried out through the application of the same burst or bursts of microwave radiation, and subsequent separation of the first and second protective sheets 121, 122 from the at least one solar cell 100 may also occur substantially at the same time. Nevertheless, it is conceived that, in alternative embodiments, a sequential delamination process may be undertaken with: the first encapsulant material 111 being melted, softened and/or structurally modified before or after the second encapsulant material 112 is melted, softened and/or structurally modified; and/or the first protective sheet 121 being separated from the at least one solar cell 100 before or after the second protective sheet 122 is separated from the at least one solar cell 100.

A separation force may be applied to the first and/or second protective sheets 121, 122, as illustrated by arrows 134 and 135, respectively, to assist in the separation of these sheets from the at least one solar cell 100. The separation force may be applied by one or more separation devices although in some embodiments separation may occur at least partly or solely due to the structural modification (e.g. expansion) of the encapsulant material or under the effect of a force such as gravity, for example.

In some embodiments, the first protective sheet 121 may comprise a glass layer and may be generally at the front of the PV module. In some embodiments, the second protective sheet 122 may comprise a glass layer and may generally be at the rear of the PV module. However, in alternative embodiments, at least the second protective sheet 122 may comprise a material other than glass, e.g., a polymeric layer such as a polyvinyl fluoride (PVF) layer, or a PVF and polyester (e.g. a Tedlar™ Polyester Tedlar™ (TPT)) layer, or a polyethylene terephthalate (PVT) layer.

Figure 3:
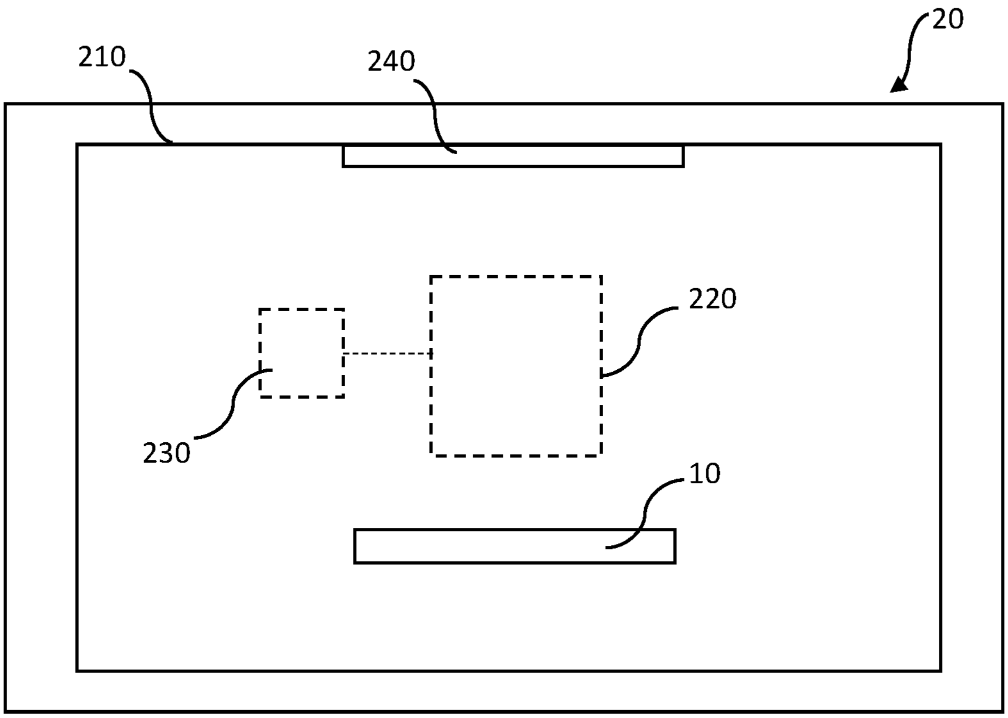
FIG. 3 shows a photovoltaic module delamination apparatus according to an embodiment of the present disclosure.

Photovoltaic module delamination apparatus 20 according to an embodiment of the present disclosure is illustrated in FIG. 3. The apparatus includes a holder 210 for receiving a PV module 10, generally as described above, a microwave device 220 and a controller 230 configured to control the microwave device 220 to apply (and stop or reduce) microwave radiation to the at least one solar cell 100 of the photovoltaic module 10 generally to carry out the method as described above with references to FIGS. 1 and 2*a* or 2*b*.

In this embodiment, the holder 210 is generally configured as an enclosed cavity (e.g. of a type used in a traditional microwave oven) and the microwave device 220 may be a magnetron or other solid-state microwave generator.

In some embodiments, the apparatus 20 may additionally include a conventional (non-microwave) thermal heat source 240, which may be used to partially heat the at least one solar cell 100 of the photovoltaic module 10, assisting the at least one solar cell 100 in reaching the desired temperature in combination with the application of the microwave radiation. The conventional thermal heat source 240 may employ an electrical heating element or gas-burner for example, and may heat the at least one solar cell through conduction, convection and/or infra-red radiation.

Figure 4:
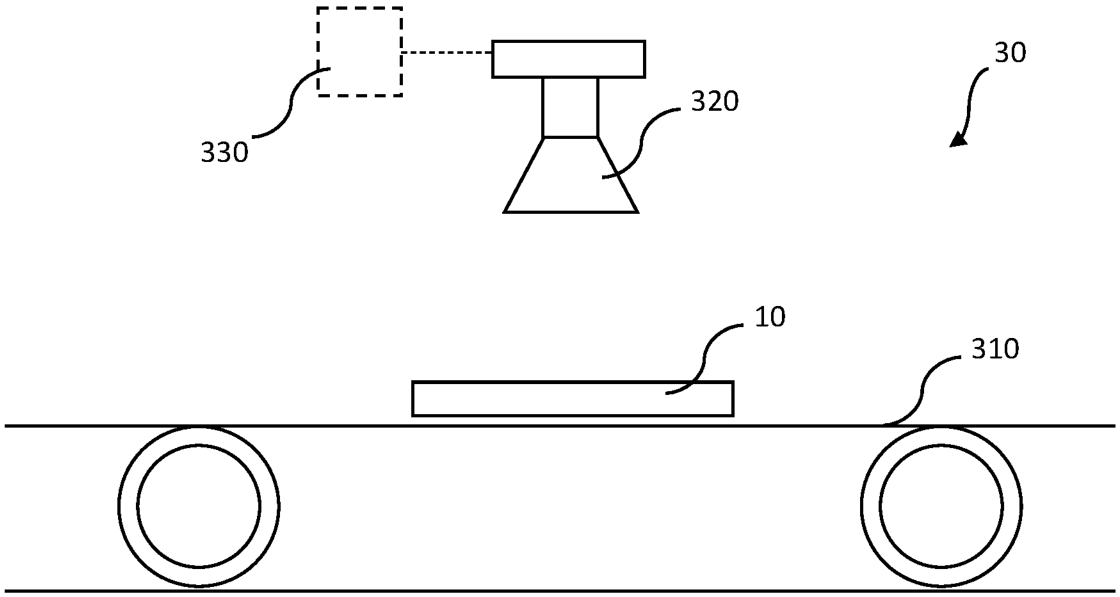
FIG. 4 shows a photovoltaic module delamination apparatus according to another embodiment of the present disclosure.

In an alternative embodiment, with reference to FIG. 4, apparatus 30 is provided in which the holder 310 has an open configuration, such as being in the form of a conveyor belt 310 as illustrated in FIG. 4, and the microwave device is a microwave gun or microwave antenna 320, controlled by a controller 330. This may provide for inline processing that increases PV module delaminating speeds over the enclosed cavity arrangement illustrated in FIG. 3. Optionally the apparatus 30 may also employ an additional thermal heat source, similar to the heat source 240 described above with reference to the apparatus 20 of FIG. 3.

Figure 5:
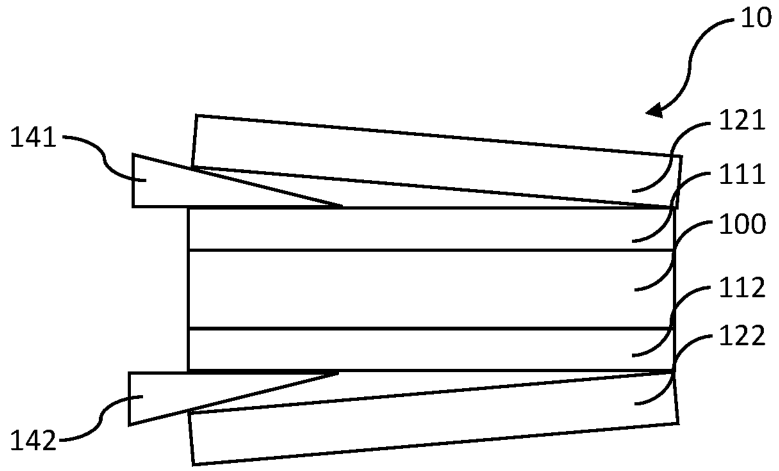
FIG. 5 shows separation devices according to an embodiment of the present disclosure.

Although not illustrated in FIGS. 3 and 4, the apparatus 20, 30 may comprise one or more separation devices 141, 142 as illustrated in FIG. 5, for example. The separation device(s) 141, 142 may be configured to separate the first protective sheet 121 from the at least one solar cell 100 while the first encapsulant material 111 is in a melted, softened and/or structurally modified state, and/or separate the second protective sheet 122 from the at least one solar cell 100 while the second encapsulant material 112 is in a melted, softened state and/or structurally modified state. First and second separation devices 141, 142 as illustrated in FIG. 5 comprise movable wedges although other mechanical separation devices such as a robotic arm, a lever or otherwise may be used.

In alternative embodiments of the present disclosure, it is recognised that the methods and apparatuses may be utilised to delaminate a PV module that does not necessarily include the encapsulant material 111, 112 between the at least one solar cell 100 and the first and/or second protective sheet 121, 122. In these alternative aspects, the first and/or second protective sheet 121, 122 may be formed of a material that can melt, soften or structurally modify (at least partially in the vicinity of the at least one solar cell 100) upon heat being transferred from the at least one solar cell 100 to the first and/or second protective sheet 121, 122. For example, the first and/or second protective sheet may comprise a low-melting point glass, plastic or acrylic (e.g. <250° C. or <235° C. melting point) or other material. The first and/or second protective sheet 121, 122 may be configured to melt, soften or structurally modify (at least partially in the vicinity of the at least one solar cell) and be separated directly from the at least one solar cell 100, without necessarily requiring melting, softening or structural modification of a separate first and/or second encapsulant material 111, 112. An EVA-free delamination method may therefore be employed, for example.

Figure 6:
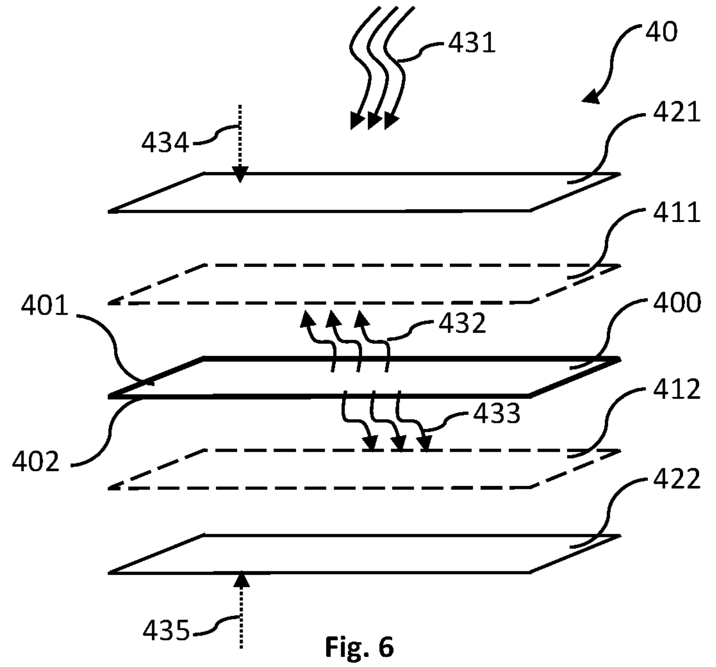
FIG. 6 shows a schematic exploded drawing of a photovoltaic (PV) module stack in a manufacturing method according to an embodiment of the present disclosure.

FIG. 6 illustrates a PV module stack 40 of layers that can form a PV module that is manufactured according to one or more methods of the present disclosure.

The layers of the PV module include at least one solar cell 400 having first and second opposite surfaces 401, 402, a first protective sheet 421 and a first encapsulant material 411 positioned between the first surface 401 of the at least one solar cell 400 and the first protective sheet 421.

Figure 7A:
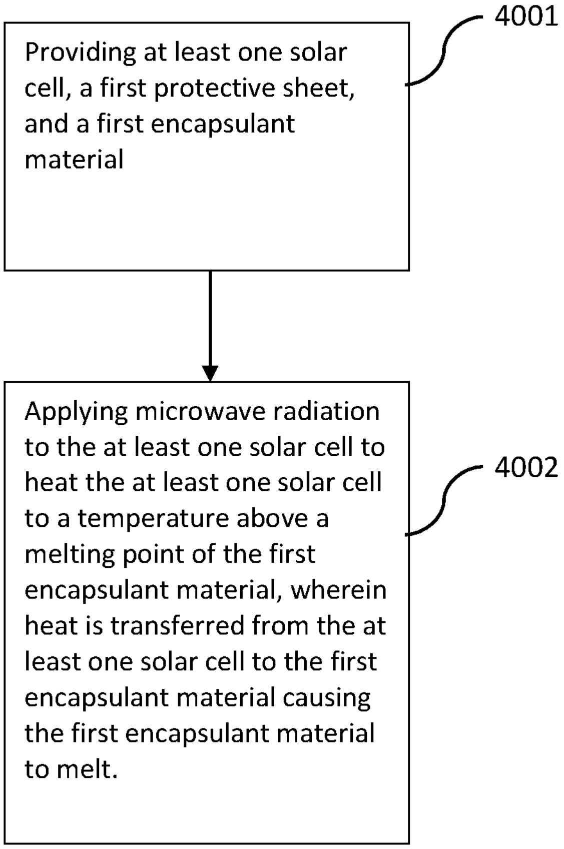
FIGS. 7*a* and 7*b* show flowcharts of methods of manufacturing a PV module according to embodiments of the present disclosure.

With reference to FIG. 7*a*, in a method of manufacturing a PV module according to the present disclosure, after providing 4001 the at least one solar cell 400, the first protective sheet 421 and the first encapsulant material 411, the method further comprises applying 4002 microwave radiation (represented by arrows 431 in FIG. 6) to the at least one solar cell 400 to heat the at least one solar cell 400 to a temperature above a melting or softening point of the first encapsulant material 411, wherein heat (represented by arrows 432 in FIG. 6) is transferred from the at least one solar cell 400 to the first encapsulant material 411 causing the first encapsulant material 411 to melt or soften.

In some embodiments, and as illustrated in FIG. 6, the layers of the PV module may also include a second protective sheet 422 and a second encapsulant material 412 positioned between the second surface 402 of the at least one solar cell 400 and the second protective sheet 422.

Figure 7B:
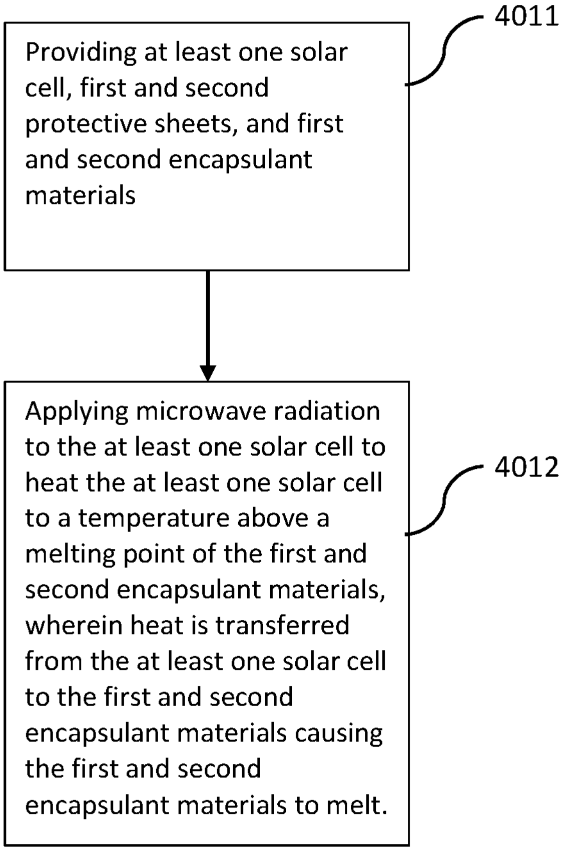

With reference to FIG. 7*b*, in a method of manufacturing a PV module according to the present disclosure, after providing 4011 the at least one solar cell 400, the first and second protective sheets 421, 422 and the first and second encapsulant materials 411, 412, the method further comprises applying 4012 microwave radiation (represented by arrows 431 in FIG. 6) to the at least one solar cell 400 to heat the at least one solar cell 400 to a temperature above a melting or softening temperature of the first and second encapsulant materials 411, 412 wherein heat (represented by arrows 432, 433 in FIG. 6) is transferred from the at least one solar cell 400 to the first and second encapsulant materials 411, 412 causing the first and second encapsulant materials 411, 412 to melt or soften.

In embodiments of the present disclosure, the methods may further include stopping or reducing the application of the microwave radiation 431 to the at least one solar cell 400, wherein the first encapsulant material 411 sets or hardens (or both the first and second encapsulant materials 411, 412 set or harden), thus fixing the first protective sheet 421 (or fixing both the first and second protective sheets 421, 422) to the at least one solar cell.

The fixing of the first protective sheet 421 and the second protective sheet 422 to the at least one solar cell 400 may occur substantially simultaneously. For example, the melting or softening of the first encapsulant material 411 and the melting or softening of the second encapsulant material 412 may be carried out through the application of the same burst or bursts of microwave radiation 431, and subsequent cooling and setting of the first and second encapsulant materials 411, 412 may occur substantially at the same time. The first and second encapsulant materials 411, 412 may therefore both be positioned between the respective first and second surfaces 401, 402 of the at least one solar cell 400 prior to the application of the microwave radiation 431 as shown in FIG. 6. Nevertheless, it is conceived that, in alternative embodiments, a sequential lamination process may be undertaken with the first protective sheet 421 being fixed to the at least one solar cell 400 before or after the second protective sheet 422 is fixed to the at least one solar cell 400.

A compression force may be applied to the first and/or second protective sheets 421, 422, as illustrated by arrows 434 and 435, respectively, to assist in the fixing of these sheets 421, 422 to the at least one solar cell 400. However, the method of the present disclosure may be such that a compression force is not needed.

In some embodiments, the first protective sheet 421 may comprise a glass layer and may be generally at the front of the PV module. In some embodiments, the second protective sheet 422 may comprise a glass layer and may generally be at the rear of the PV module. However, in alternative embodiments, at least the second protective sheet 422 may comprise a material other than glass, e.g., a polymeric layer such as a polyvinyl fluoride (PVF) layer, or a PVF and polyester (e.g. a Tedlar™ Polyester Tedlar™ (TPT)) layer, or a polyethylene terephthalate (PVT) layer.

Figure 8:
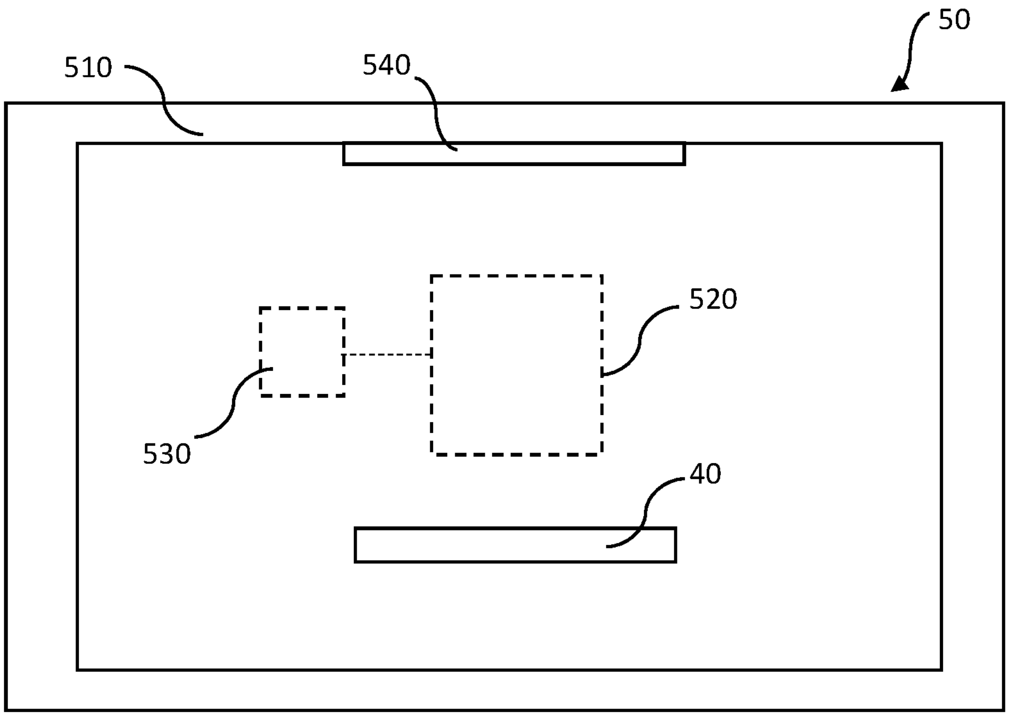
FIG. 8 shows a PV module lamination apparatus according to an embodiment of the present disclosure.

Solar cell lamination apparatus 50 according to an embodiment of the present disclosure is illustrated in FIG. 8. The apparatus includes a holder 510 for receiving a PV module stack 40, generally as described above, a microwave device 520 and a controller 530 configured to control the microwave device 520 to apply (and stop or reduce) microwave radiation to the at least one solar cell 400 generally to carry out the method as described above with references to FIGS. 6 and 7*a* or 7*b*.

In this embodiment, the holder 510 is generally configured as an enclosed cavity (e.g. of a type used in a traditional microwave oven) and the microwave device 520 may be a magnetron or other solid-state microwave generator.

In some embodiments, the apparatus 50 may additionally include a conventional (non-microwave) thermal heat source 540, which may be used to partially heat the at least one solar cell 400 of the stack 40, assisting the at least on solar cell 400 in reaching the desired temperature in combination with the application of the microwave radiation. The conventional thermal heat source 540 may employ an electrical heating element or gas-burner for example, and may heat the at least one solar cell 400 through conduction, convection and/or infra-red radiation.

Figure 9:
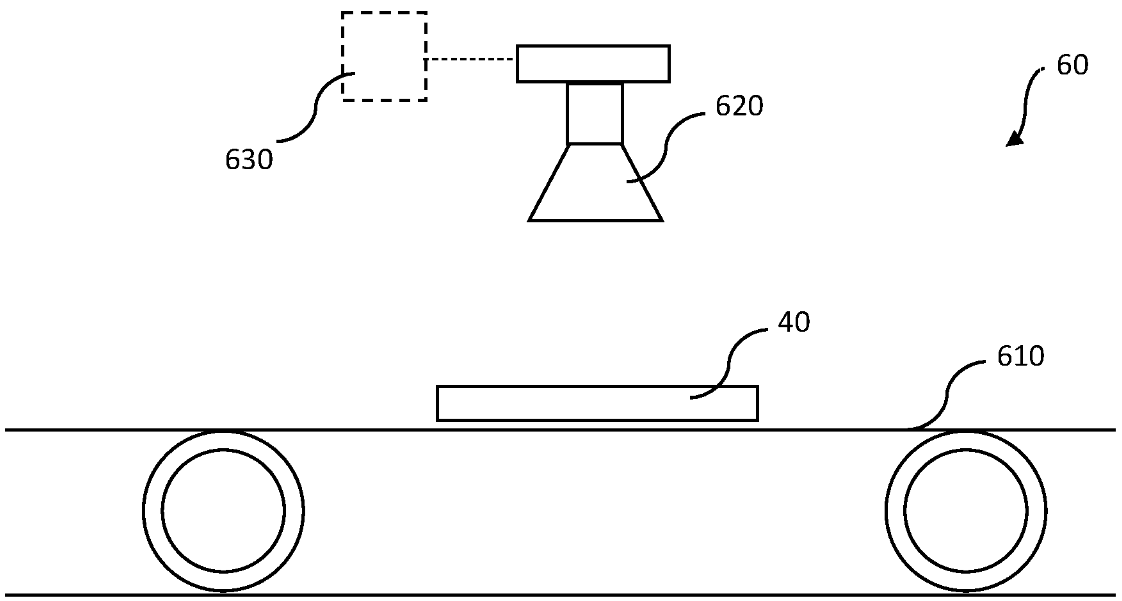
FIG. 9 shows a PV module lamination apparatus according to another embodiment of the present disclosure.

In an alternative embodiment, with reference to FIG. 9, apparatus 60 is provided in which the holder 610 has an open configuration, such as being in the form of a conveyor belt 610 as illustrated in FIG. 9, and the microwave device is a microwave gun or microwave antenna 620 controlled by a controller 630. This may provide for inline processing that increases PV module manufacturing speeds over the enclosed cavity arrangement illustrated in FIG. 8. Although not illustrated in FIGS. 8 and 9, the apparatus 50, 60 may comprise a compression device to apply a force to the first and/or second protective sheets 421, 422 to assist in their fixing to the solar cell 400. However, the method of the present disclosure may be such that a compression device is not needed. Optionally the apparatus 60 may also employ an additional thermal heat source, similar to the heat source 540 described above with reference to the apparatus 50 of FIG. 8.

In alternative embodiments of the present disclosure, it is recognised that the methods and apparatus may be utilised to manufacture a PV module that does not necessarily include the encapsulant material 411, 412 between the at least one solar cell 400 and the first and/or second protective sheet 421, 422. In these alternative aspects, the first and/or second protective sheet 421, 422 may be formed of a material that can melt or soften upon heat being transferred from the at least one solar cell 400 to the first and/or second protective sheet 421, 422. For example, the first and/or second protective sheet may comprise a low-melting point glass, plastic or acrylic (e.g. <250° C. or <235° C. melting point) or other material. The first and/or second protective sheet 421, 422 may be configured to melt or soften and fix directly to the at least one solar cell 400, without necessarily requiring use of a separate first and/or second encapsulant material 411, 412. An EVA-free lamination method may therefore be employed, for example.

Experimental Example 1

Figure 10:
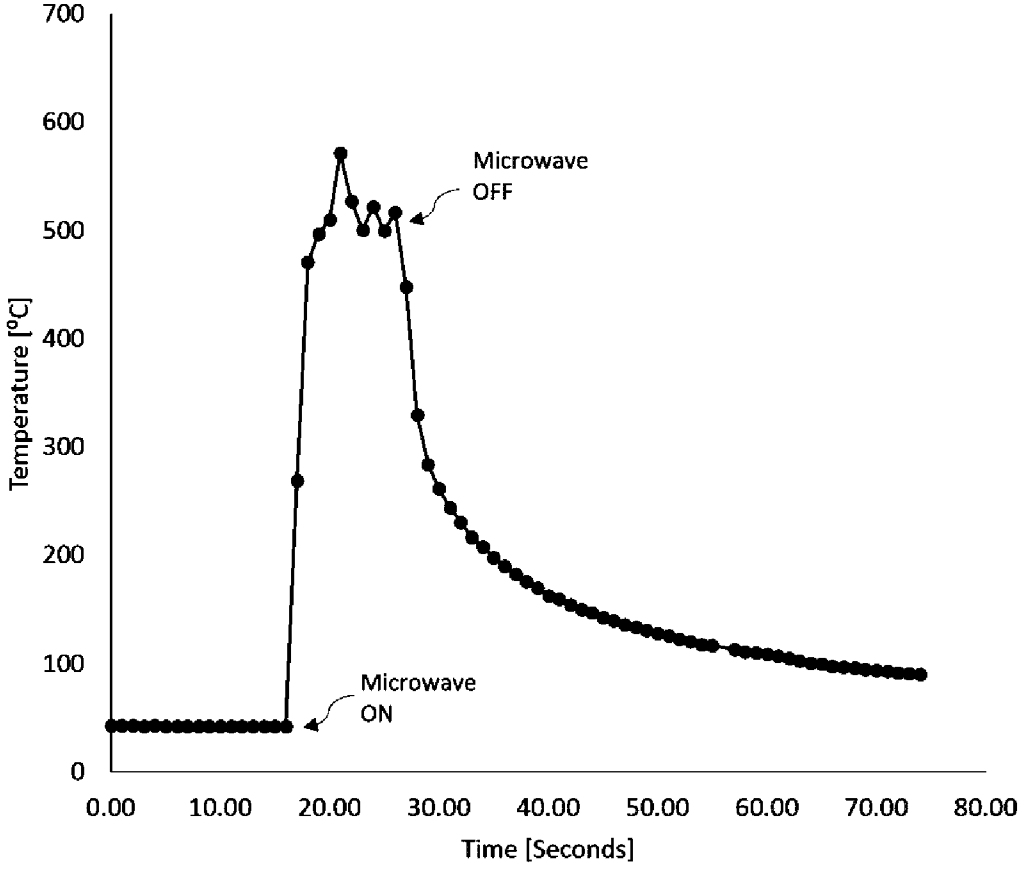
FIG. 10 shows a graph of temperature of a solar cell over time according to experimental examples of the present disclosure.

A stack including from front-to-back a protective glass layer, EVA encapsulant layer, silicon solar cell layer, EVA encapsulant layer and a protective back sheet was inserted into an inverter-type microwave cavity oven. Microwave radiation was applied to the stack at a frequency of 2.45 GHz. The glass, EVA and back sheet were transparent to microwave radiation at 2.45 GHz. However, with reference to FIG. 10, the silicon solar cells absorbed the radiation and heated up at a rate of about 250° C./s at 1000 W microwave radiation power setting. The temperature of the solar cell saturated between about 500° C. and 600° C. due to thermal exchange with the local environment.

To heat the solar cells of the stack for delamination a reduced microwave power setting of 500 W was used for 5 minutes. The temperature of the solar cells saturated between 200° C. and 300° C. due to thermal exchange with the local environment. This temperature was sufficient to cause the encapsulant layers to melt or soften and for the protective layers to be separate from the solar cells. After this delamination, chemicals may be applied to dissolve the EVA.

In general, however, appropriate power levels and the processing times for delamination will vary depending on the microwave equipment, the thermal mass and dimensions of the stack, the frequency used and the type of encapsulant and protective sheets used.

It was observed that microwave delamination works for solar cells with and without an anti-reflection coating and also with and without the emitter diffusion. Thermal images showed good temperature uniformity for a 6-inch cell stack. For stacks in the size of a regular module, the uniformity in a cavity may be improved by (1) frequency sweeping and/or (2) using a higher central microwave frequency e.g.: 5.8 GHz or 24.125 GHz. Higher frequencies may give better heating uniformity and also higher heating rates.

Experimental Example 2

A stack including from front-to-back a protective glass layer, EVA encapsulant layer, silicon solar cell layer, EVA encapsulant layer and a protective back sheet was inserted into an inverter-type microwave cavity oven. Microwave radiation was applied to the stack at a frequency of 2.45 GHz. The glass, EVA and back sheet were transparent to microwave radiation at 2.45 GHz. However, with reference to FIG. 10, the silicon solar cells absorbed the radiation and heated up at a rate of about 250° C./s at 1000 W microwave radiation power setting. The temperature of the solar cell saturated between about 500° C. and 600° C. due to thermal exchange with the local environment. To reduce the heating rate to approximately 50° C./s, the power level was reduced to 400 W and the stack processed for 7 minutes (the solar cell temperature being estimated to saturate around 200° C. after 4 to 5 seconds), which was above the melting temperature of the EVA (roughly 90 to 120° C.). In general, however, appropriate power levels and the processing times for lamination will vary depending on the microwave equipment, the thermal mass and dimensions of the stack, the frequency used and the type of encapsulant and protective sheets used. There was no pressure applied to the stack in the microwave in the experiments.

It was observed that microwave lamination works for solar cells with and without an anti-reflection coating and also with and without the emitter diffusion. Thermal images showed good temperature uniformity for a 6-inch cell stack. For stacks in the size of a regular module, the uniformity in a cavity may be improved by (1) frequency sweeping and/or (2) using a higher central microwave frequency e.g.: 5.8 GHz or 24.125 GHz. Higher frequencies may give better heating uniformity and also higher heating rates.

It will be appreciated by persons skilled in the art that numerous variations and/or modifications may be made to the above-described embodiments, without departing from the broad general scope of the present disclosure. For example, in some embodiments, a conventional thermal heat source may be used (e.g. within or adjacent the cavity 210, 510 of FIGS. 3 and 8 or conveyor 310, 610 of FIGS. 4 and 9) to partially heat the at least one solar cell, with the solar cell reaching the desired temperature through the application of the microwave radiation. The conventional thermal heat source may employ an electrical heating element or gas-burner for example, and may heat the at least one solar cell through conduction, convection and/or infra-red radiation. As another example, although aspects and embodiments of the present disclosure set forth above are directed to delaminating of PV modules including solar cells and manufacturing/lamination of PV modules including solar cells, it is conceived that the same methods and apparatuses may be used to delaminate or laminate other semiconductor devices, which may utilise a microwave absorbing semiconductor (e.g. silicon) element other than a solar cell, yet may also be constructed with one or more protective sheets generally in the manner described herein. The present embodiments are, therefore, to be considered in all respects as illustrative and not restrictive.

The invention claimed is:

1. A method of delaminating a photovoltaic module, the photovoltaic module comprising at least one solar cell comprising silicon, the solar cell having a first surface and a second surface opposite to the first surface, a first protective sheet, and a first encapsulant material positioned between the first surface of the at least one solar cell and the first protective sheet and fixing the first protective sheet to the at least one solar cell, the method comprising:

applying microwave radiation to the at least one solar cell to heat the at least one solar cell to a temperature above a melting or softening temperature of the first encapsulant material, wherein heat is transferred from the at least one solar cell to the first encapsulant material, wherein:

the heat transferred from the at least one solar cell to the first encapsulant material causes the first encapsulant material to be in a melted or softened state and the method comprises separating the first protective sheet from the at least one solar cell while the first encapsulant material is in the melted or softened state; or the heat transferred from the at least one solar cell to the first encapsulant material causes a structural modification in the first encapsulant material and wherein the structural modification causes partial or full separation of the first protective sheet from the at least one solar cell.

2. A method of delaminating a photovoltaic module, the photovoltaic module comprising at least one solar cell comprising silicon, the solar cell having a first surface and a second surface opposite to the first surface, a first protective sheet, and a first encapsulant material positioned between the first surface of the at least one solar cell and the first protective sheet and fixing the first protective sheet to the at least one solar cell, the method comprising:

applying microwave radiation to the at least one solar cell to heat the at least one solar cell to a temperature above a melting or softening temperature of the first encapsulant material, wherein heat is transferred from the at least one solar cell to the first encapsulant material, wherein the photovoltaic module comprises a second protective sheet, and a second encapsulant material positioned between the second surface of the at least one solar cell and the second protective sheet and fixing the second protective sheet to the at least one solar cell, and the method further comprises:

applying microwave radiation to the at least one solar cell to heat the at least one solar cell to a temperature above a melting or softening temperature of the second encapsulant material, wherein heat is transferred from the at least one solar cell to the second encapsulant material.

3. The method of claim 2, wherein the heat transferred from the at least one solar cell to the second encapsulant material causes the second encapsulant material to be in a melted or softened state and the method comprises separating the second protective sheet from the at least one solar cell while the second encapsulant material is in the melted or softened state.

4. The method of claim 2, wherein the heat transferred from the at least one solar cell to the second encapsulant material causes a structural modification in the second encapsulant material and wherein the structural modification causes partial or full separation of the second protective sheet from the at least one solar cell.

5. A method of delaminating a photovoltaic module, the photovoltaic module comprising at least one solar cell comprising silicon, the solar cell having a first surface and a second surface opposite to the first surface, a first protective sheet, and a first encapsulant material positioned between the first surface of the at least one solar cell and the first protective sheet and fixing the first protective sheet to the at least one solar cell, the method comprising:

applying microwave radiation to the at least one solar cell to heat the at least one solar cell to a temperature above a melting or softening temperature of the first encapsulant material, wherein heat is transferred from the at least one solar cell to the first encapsulant material, wherein the first protective sheet comprises a glass layer.

6. The method of claim 2, wherein the second protective sheet comprises a glass layer or comprises a polymeric layer.

7. The method of claim 1, wherein the microwave radiation has a frequency of between 1 GHz and 300 GHz, or 1 GHz and 100 GHz, or 2 GHz and 50 GHz.

8. The method of claim 1, wherein the microwave radiation heats the at least one solar cell to a temperature of at least 90° C., at least 120° C., at least 150° C., at least 200° C., or at least 250° C.

9. The method of claim 1, wherein no solvent is used to dissolve or otherwise modify the first encapsulant material prior to separation of the first protective sheet from the at least one solar cell.

10. A method of delaminating a photovoltaic module, the photovoltaic module comprising at least one solar cell comprising silicon, the solar cell having a first surface and a second surface opposite to the first surface, a first protective sheet, and a first encapsulant material positioned between the first surface of the at least one solar cell and the first protective sheet and fixing the first protective sheet to the at least one solar cell, the method comprising:

applying microwave radiation to the at least one solar cell to heat the at least one solar cell to a temperature above a melting or softening temperature of the first encapsulant material, wherein heat is transferred from the at least one solar cell to the first encapsulant material; and applying heat to the at least one solar cell from a conventional thermal heat source, wherein the heat from the conventional thermal heat source assists the heating of the at least one solar cell to a temperature above a melting or softening temperature of the first encapsulant material.

11. A photovoltaic module delamination apparatus comprising:

a holder for receiving a photovoltaic module, the photovoltaic module comprising at least one solar cell comprising silicon, the solar cell having a first surface and a second surface, a first protective sheet, and a first encapsulant material positioned between the first surface of the at least one solar cell and the first protective sheet and fixing the first protective sheet to the at least one solar cell;

a microwave device; and a controller configured to control the microwave device to apply microwave radiation to the at least one solar cell to heat the at least one solar cell to a temperature above a melting or softening temperature of the first encapsulant material, wherein heat is transferred from the at least one solar cell to the first encapsulant material; wherein:

the heat transferred from the at least one solar cell to the first encapsulant material causes the first encapsulant material to melt or soften; or wherein the heat transferred from the at least one solar cell to the first encapsulant material causes a structural modification in the first encapsulant material and wherein the structural modification causes partial or full separation of the first protective sheet from the at least one solar cell.

12. A photovoltaic module delamination apparatus comprising:

a holder for receiving a photovoltaic module, the photovoltaic module comprising at least one solar cell comprising silicon, the solar cell having a first surface and a second surface, a first protective sheet, and a first encapsulant material positioned between the first surface of the at least one solar cell and the first protective sheet and fixing the first protective sheet to the at least one solar cell;

a microwave device;

a controller configured to control the microwave device to apply microwave radiation to the at least one solar cell to heat the at least one solar cell to a temperature above a melting or softening temperature of the first encapsulant material, wherein heat is transferred from the at least one solar cell to the first encapsulant material; and a separation device configured to separate the first protective sheet from the at least one solar cell while the first encapsulant material is in a melted, softened, or structurally modified state.

13. A photovoltaic module delamination apparatus comprising:

a holder for receiving a photovoltaic module, the photovoltaic module comprising at least one solar cell comprising silicon, the solar cell having a first surface and a second surface, a first protective sheet, and a first encapsulant material positioned between the first surface of the at least one solar cell and the first protective sheet and fixing the first protective sheet to the at least one solar cell;

a microwave device; and a controller configured to control the microwave device to apply microwave radiation to the at least one solar cell to heat the at least one solar cell to a temperature above a melting or softening temperature of the first encapsulant material, wherein heat is transferred from the at least one solar cell to the first encapsulant material, wherein:

(i) the holder comprises an enclosed cavity and the microwave device is a magnetron or other solid-state microwave generator; or (ii) the holder has an open configuration; and the microwave device comprises a microwave gun or microwave antenna.

14. A photovoltaic module delamination apparatus comprising:

a holder for receiving a photovoltaic module, the photovoltaic module comprising at least one solar cell comprising silicon, the solar cell having a first surface and a second surface, a first protective sheet, and a first encapsulant material positioned between the first surface of the at least one solar cell and the first protective sheet and fixing the first protective sheet to the at least one solar cell;

a microwave device; and a controller configured to control the microwave device to apply microwave radiation to the at least one solar cell to heat the at least one solar cell to a temperature above a melting or softening temperature of the first encapsulant material, wherein heat is transferred from the at least one solar cell to the first encapsulant material, wherein the holder comprises a conveyor belt.

15. A photovoltaic module delamination apparatus comprising:

a holder for receiving a photovoltaic module, the photovoltaic module comprising at least one solar cell comprising silicon, the solar cell having a first surface and a second surface, a first protective sheet, and a first encapsulant material positioned between the first surface of the at least one solar cell and the first protective sheet and fixing the first protective sheet to the at least one solar cell;

a microwave device;

a controller configured to control the microwave device to apply microwave radiation to the at least one solar cell to heat the at least one solar cell to a temperature above a melting or softening temperature of the first encapsulant material, wherein heat is transferred from the at least one solar cell to the first encapsulant material; and a conventional thermal heat source configured to assist the heating of the at least one solar cell to a temperature above a melting or softening temperature of the first encapsulant material.

* * * * *